Figure 1:
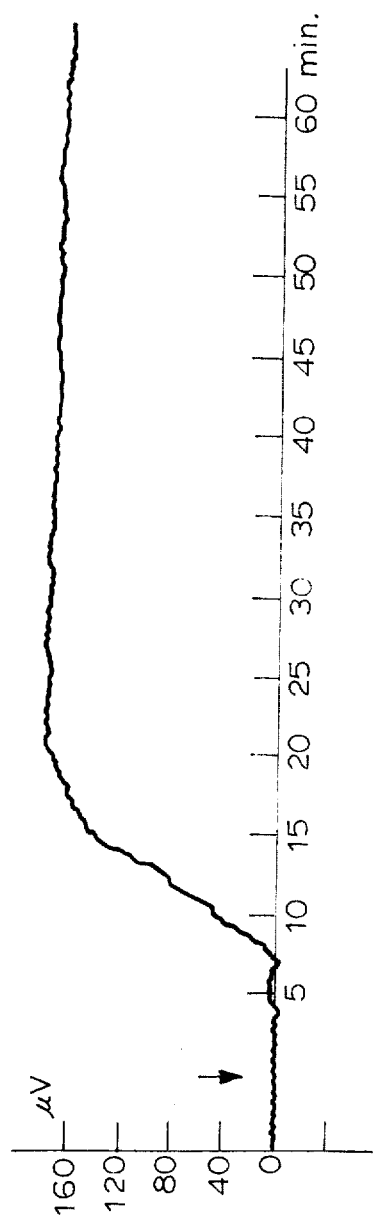

United States Patent [19]
Nakamura et al.

[11] 3,890,333
[45] June 17, 1975

[54] CHROMANOL NICOTINATE DERIVATIVES

[75] Inventors: Tetsuya Nakamura, Kawagoe; Shizumasa Kijima, Tokyo, both of Japan

[73] Assignee: Eisai Company, Ltd., Japan

[22] Filed: June 13, 1973

[21] Appl. No.: 369,432

[30] Foreign Application Priority Data
June 24, 1972 Japan.............................. 47-62845

[52] U.S. Cl. 260/295.5 B; 260/295.5 R; 260/345.5; 424/266
[51] Int. Cl.²..................................... C07D 213/55
[58] Field of Search.... 260/295.5 B, 295 F, 295.5 R

[56] References Cited
OTHER PUBLICATIONS
Wakasa et al., Chem. Abstracts, Vol. 65, (6), 9460f–9460h, (Sept. 12, 1966).

Fujita et al., Chem. Abstracts, Vol. 62, (9), 10,417d, (April 26, 1965).

*Primary Examiner*—Alan L. Rotman
*Attorney, Agent, or Firm*—Wenderoth, Lind & Ponack

[57] ABSTRACT

New chromanol nicotinate derivatives prepared by reacting chromanol derivatives with nicotinic acid or its reactive derivatives; the new compounds possessing pharmacological characteristics especially of promoting peripheral blood circulation and thus useful for the prophylaxis and the therepeutic treatment of the circulatory system disorders.

9 Claims, 2 Drawing Figures

CHROMANOL NICOTINATE DERIVATIVES

This invention relates to new chromanol nicotinate derivatives and a process for the synthesis of chromanol nicotinate derivatives represented by the following formula:

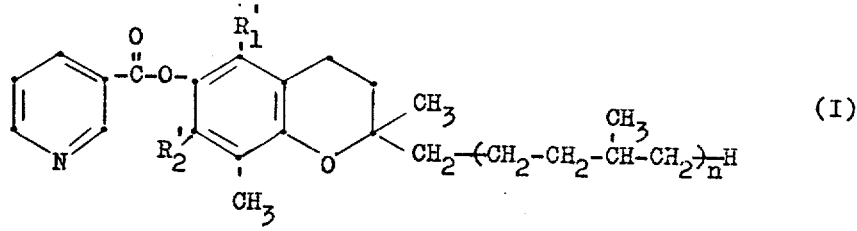

(I)

wherein $n$ designates 0 or an integer of from 1 to 3; $R_1'$ designates a radical of

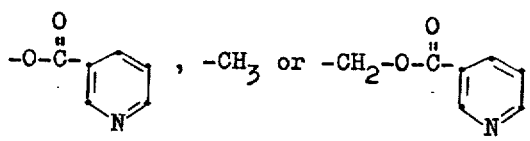

and $R_2'$ designates a radical $-CH_3$ or

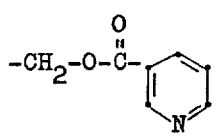

with the provision that $R_2'$ is $-CH_3$ where $R_1'$ is

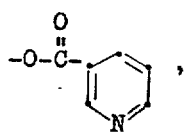

and that there is no case where both the radicals $R_1'$ and $R_2'$ are simultaneously the radicals of $-CH_3$.

We have found that these new compounds of the general formula (I) as described above possess characteristics promoting peripheral blood circulation. Therefore, these compounds are useful for the prophylaxis and therapeutic treatment of circulatory system disorders.

These superior peripheral blood circulatory promoting characteristics represented by the particular compounds of the present invention had been proved by measuring the amount of blood circulation in accordance with the method of Y. Hagihara et al in the Journal of the Chiba Medical Society, volume 41, page 384 (1965).

The method for the measurement is outlined as follows:

a. Test animals: Adult male rabbits without anesthesia.
b. The apparatus used: SHINCORDER-CTE-401, a blood-flow measuring apparatus, made by Shin-Ei Company Limited, Japan (The attachment used for the measurement was Plate-type p-6).
c. The materials administered and the dosage thereof:
   i. The test material: 12.5 mg/kg of 5-nicotinoyloxymethyl-γ-tocopheryl nicotinate which has been prepared by the method of the present invention.
   ii. The standard material: A combination of 8.2 mg/kg of α-tocopherol and 4.7 mg/kg of nicotinic acid.

Separately, both of the materials were administered intravenously in the form of an emulsion prepared by the aid of soya lecithin and Pluronic F-68 of Wyandotte Company as emulsifying agents. The test material is hereinafter called Preparation A, and the combination of the standard materials is called Preparation B.

d. Procedure of the measurement: For the comparison of the effects of Preparation A and Preparation B, the same animal was used in order to avoid any effects due to differences of animals.

After the hairs behind one ear-lobe of the rabbit were removed by a depilatory cream, the blood-flow measuring apparatus was attached directly behind the ear-lobe. Preparation A was then injected intravenously into the other ear-lobe, and the variations of the blood-flow in the peripheral blood vessel were measured continuously for a certain period of time. After the termination of the experiment, it was confirmed that the rabbit suffered no residual effects. Twelve hours later, Preparation B was then administered intravenously into the same ear-lobe and the volume of the blood-flow in the preipheral blood vessels was measured for the same period of time in the same manner as mentioned above.

Figure 2:
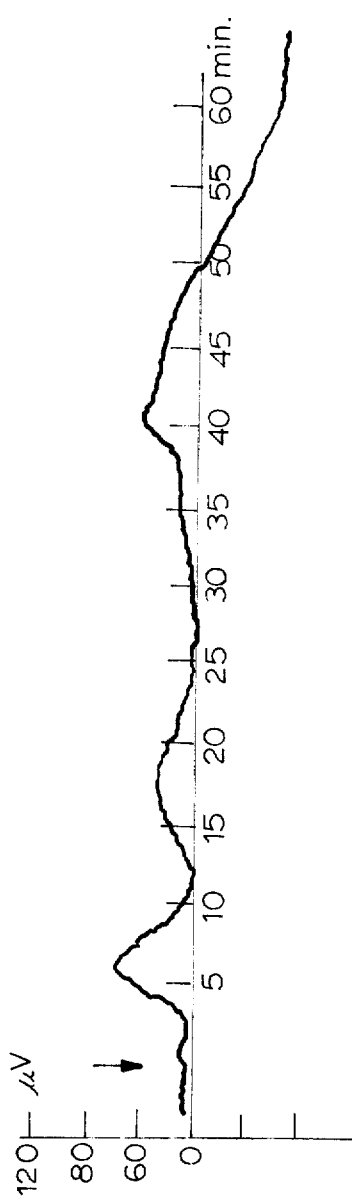

The microvoltages ($\mu v$) which corresponded to the variations in the blood-flow of the peripheral blood vessels were continuously recorded on a pen-recorder system throughout the experiment. The resulting graphical records are shown in the accompanying FIGURES. FIG. 1 is the result of the administration of Preparation A and FIG. 2 is the result of the administration of Preparation B.

In the figures, the voltages in $\mu v$ unit observed are represented in the ordinates and the times in minutes during the observation preiod are represented in the abscissas.

After Preparation A was administered, the original blood-flow level was completely restored within 160 minutes.

In order to examine the effects on the time sequence, the same experiment on another rabbit was done in the reverse time sequence, no differences were observed.

As will be seen in the figures, the peripheral blood-flow promoting effect of Preparation A is some 2–3 times greater than that of Preparation B. In addition, it was observed that with the administration of Preparation A, there was no diminution of the blood-flow which is a rebound phenomenon usually observed after the blood-flow increment due to the administration of nicotinic acid. A lasting effect of blood-flow stimulation was further observed by the administration of Preparation A. The compounds represented by the general formula (I) may be used in the treatment of various symptoms such as headache, tinnitus, paralysis, dizziness, numbness, back stiffness, chills and the like ascribable to circulatory disturbances.

The process of the present invention is performed by the reaction of a chroman derivative represented by the general formula:

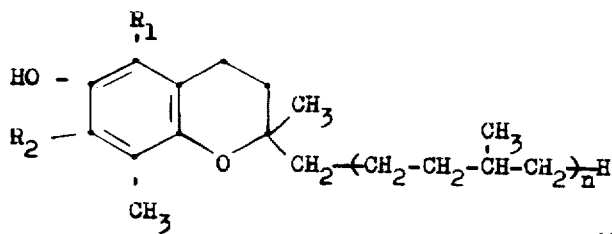

(II)

wherein *n* designates the 0 or an integer of 1 to 3; $R_1$ designates a radical selected from the group consisting of —OH, —$CH_3$, and —$CH_2OH$; $R_2$ designates a radical —$CH_3$ or —$CH_2OH$, with the provision that $R_2$ is the radical —$CH_3$ where $R_1$ is —OH and that there is no case where both the radicals $R_1$ and $R_2$ are simultaneously the radicals —$CH_3$, with nicotinic acid or its reactive derivative.

Because the compound of the formula (II), wherein $R_1$ is —OH, is unstable in a free state, it is found advisable to use without isolation. The reaction mixture containing said hydroxyl compound is obtained by catalytical reduction of the corresponding 2,7,8-trimethyl2-substituted chroman-5,6-quinone compound, for the purpose of the intended esterification. In general formula (II), the hydroxymethyl derivatives of tocopherols are described by T. Nakamura and S. Kijima in Chemical & Pharmaceutical Bulletin (Tokyo), volume 19, page 2318 (1971) and ibid, volume 20, page 1681 (1972).

Thus, the compounds of the formula (II), used as the starting material for carrying out the process of the invention, may advantageously be obtained for example, from beta-, gamma- and delta-tocopherols in accordance with the method disclosed by T. Nakamura and S. Kijima in "Chemical and Pharmaceutical Bulletin (Tokyo)," Vol. 19, page 2318–2324 (1971). The method essentially comprises three steps, namely, the first step of formation of Mannich base by treating respectively the tocopherol series compound with an excess of amine and formaldehyde in dioxane at reflux temperature, to form the corresponding Mannich base; the second step is for reductive acetylation of the resulting Mannich base with a mixture of acetic anhydride and acetic acid and zinc dust to convert the methylamino group in the Mannich base into the acetylated hydroxymethyl group; and the third step is for deacetylation of the former with lithium aluminum hydride, for example, to produce the desired tocopherol compounds of the formula (II).

The steps of these reactions are schematically illustrated with beta-, gamma- and delta-tocopherols by means of the following structural formulae:

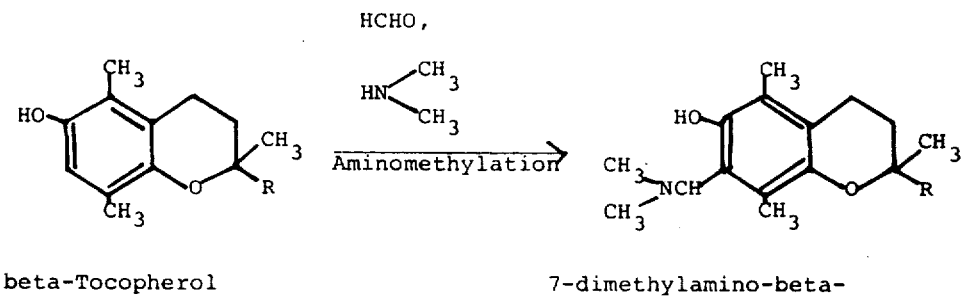

beta-Tocopherol 7-dimethylamino-beta-tocopherol
(Mannich Base)

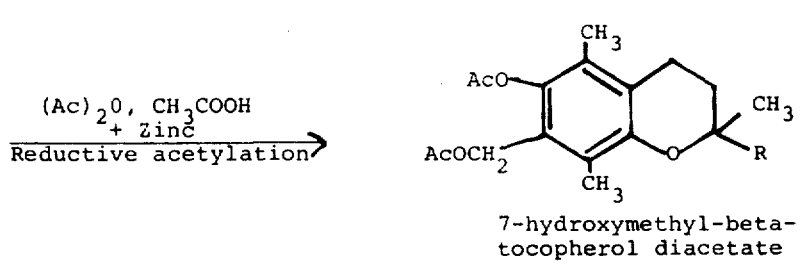

7-hydroxymethyl-beta-tocopherol diacetate

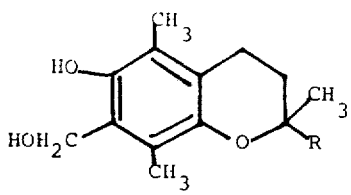

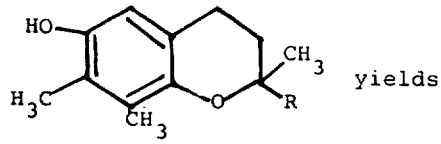

7-Hydroxymethyl-beta-tocopherol

In a similar reaction procedure, gamma-tocopherol of the formula:

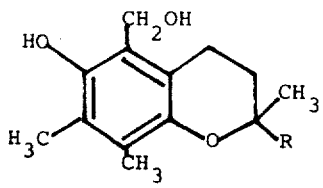 yields 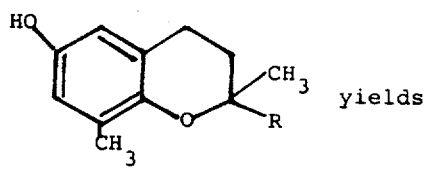

7-Hydroxymethyl gamma-tocopherol and delta-tocopherol of the formula

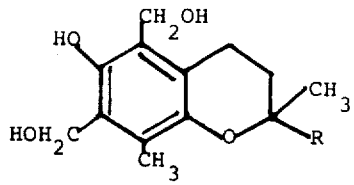 yields 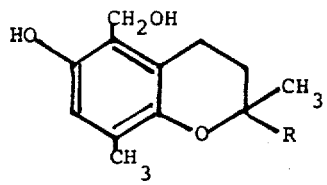

5,7-Bis(hydroxymethyl)-delta-tocopherol and/or

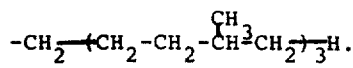

In the above formula, R is $$-CH_2-(CH_2-CH_2-\overset{CH_3}{\underset{}{CH}}-CH_2)_3-H.$$

Similarly, T. Nakamura and S. Kijima, in Chemical and Pharmaceutical Bulletin, Tokyo, Volume 20, page 1681 (1972) disclose production of 7-hydroxymethyl-β-tocopherol and 5-hydroxymethyl-γ-tocopherol by the reductive cleavage of acetoxymethyl tocopheryl acetates with lithium aluminum hydride.

Illustrative of the reactive derivatives of nicotinic acid which can be used in this invention are the corresponding acid halide, acid anhydride, acid ester and the like.

The amount of nicotinic acid or its reactive derivative employed for the establishment of the esterification is dependent upon the number of free hydroxyl groups contained in the compound of the formula (II). In general, however, it is desirable to use said compound in an amount slightly over the theoretical requirement.

The reaction may be carried out in the presence of basic solvent such as pyridine, dimethylformamide, trimethylamine and the like, because they act at the same time as a catalyst to facilitate the performance of the esterification reaction. Pyridine in particular has been found preferable for this purpose. A combined use of an inert organic solvent such as benzene, toluene, xylene and the like is recommendable to facilitate the reaction procedure.

The reaction is carried out at a temperature ranging from room temperature to an elevated temperature at which the solvent is refluxed.

The examples which follow illustrate the invention.

EXAMPLE 1

Synthesis of 7-nicotinoyloxymethyl-β-tocopheryl nicotinate

7-Hydroxymethyl-β-tocopherol (4.5 grams, 0.01 mol) was dissolved in 50 ml of benzene and 50 ml of pyridine was then added. A suspension prepared by adding 5.5 grams (0.03 mol) of hydrochloride of nicotinic acid chloride to 100 ml of benzene was added under stirring to the above solution. The stirring was then continued at room temperature for 5 hours. The reaction mixture was then filtered. The filtrate was concentrated under reduced pressure. The residue was dissolved in benzene, washed successively with 1N hydrochloric acid, water, 5 percent aqueous sodium bicarbonate solution and finally again with water. The benzene solution was dried over sodium sulfate. The sodium sulfate was then removed by filtration and the filtrate was concentrated by evaporation under reduced pressure. The residue obtained was purified on a silica gel column chromatography. Fractions eluted with a mixture of benzene-ethyl acetate were collected and the solvent was removed by evaporation under reduced pressure. 7-Nicotinoyloxymethyl-$\beta$-tocopheryl nicotinate (4.9 grams) was obtained in a light brownish-yellow viscous oil.

Elementary analysis of the product of the formula $C_{41}H_{56}N_2O_5$ was:

|  | C | H | N |
|---|---|---|---|
| Calculated (%): | 74.95 | 8.59 | 4.26 |
| Found (%): | 74.85 | 8.48 | 4.24 |

Ultraviolet analysis of the product:

| $\lambda max\ ^{(m\mu)}$: | 265 |
|---|---|
| $E_{1\ cm}^{1\%}$ ($C_2H_5OH$): | 112.2 |

EXAMPLE 2

Synthesis of 5-nicotinoyloxymethyl-$\gamma$-tocopheryl nicotinate

A mixture of 4.5 grams (0.01 mol) of 5-hydroxymethyl-$\gamma$-tocopherol, 5.5 grams (0.03 mol) of hydrochloride of nicotinic acid chloride, 50 ml of benzene, and 50 ml of pyridine was subjected to reaction at 65°C. for 3 hours. After the reaction was completed, the reaction mixture was treated in the same way as in Example 1. Five grams of the purified compound were obtained in a light yellow viscous oil.

Elementary analysis of the product of the formula $C_{41}H_{56}N_2O_5$ was:

|  | C | H | N |
|---|---|---|---|
| Calculated (%): | 74.95 | 8.59 | 4.26 |
| Found (%): | 74.82 | 8.60 | 4.26 |

Ultraviolet analysis of the product:

| $\lambda max\ ^{(m\mu)}$: | 265 |
|---|---|
| $E_{1\ cm}^{1\%}$ ($C_2H_5OH$): | 109.0 |

EXAMPLE 3

Synthesis of 5,7-bisnicotinoyloxymethyl-$\delta$-tocopheryl nicotinate

A mixture of 4.6 grams (0.01 mol) of 5,7-bishydroxymethyl-$\delta$-tocopherol and 9.2 grams (0.04 mol) of nicotinic anhydride reacted in accordance with the procedure given in Example 1 except that pyridine alone was used instead of the pyridine and benzene mixture. The purified product was first a light yellowish viscous oil which when stored in cool place changed into a light yellow crystal having a melting point of 47°–48°C. 5,7-Bis-nicotinoyloxymethyl-$\delta$-tocopheryl nicotinate (5.8 grams) was obtained.

Elementary analysis of the product of the formula $C_{46}H_{59}N_3O_7$ was:

|  | C | H | N |
|---|---|---|---|
| Calculated (%): | 72.55 | 7.62 | 5.40 |
| Found (%): | 72.28 | 7.62 | 5.58 |

EXAMPLE 4

Synthesis of 5-nicotinoyloxy-$\gamma$-tocopheryl nicotinate a. 2,7,8-Trimethyl-2-(4',8', 12'-trimethyl-tridecyl)-chroman5,6-quinone (4.3 grams, 0.01 mol) was dissolved in 50 ml of dioxane and subjected to catalytic reduction with gaseous hydrogen in the presence of a platinum oxide catalyst. When the theoretical amount of the hydrogen was consumed, the catalyst was removed by filtration. To the filtrate 100 ml of pyridine was added.

b. Nicotinic anhydride (6.8 grams, 0.03 mol) was added to the resulting pyridine solution and the whole solution was refluxed under a gaseous nitrogen flow for 2 hours. The reaction mixture was then filtered and the filtrate was concentrated by evaporation under reduced pressure. The residue thus obtained was dissolved in benzene and the solution was washed successively with 1N hydrochloric acid, water, 5 percent sodium bicarbonate aqueous solution and then again with water. The benzene solution was dried over sodium sulfate. The sodium sulfate was then removed by filtration from the solution, and the filtrate was concentrated under reduced pressure. The resulting residue was purified on a silica gel column chromatography. Fractions eluted with a mixture of benzeneethyl acetate were collected. From the collected fraction, 4.6 grams of 5-nicotinoyloxy-$\gamma$-tocopheryl nicotinate was obtained as a pale yellow, viscous oil.

Elementary analysis of the product of the formula $C_{40}H_{54}N_2O_5$ was:

|  | C | H | N |
|---|---|---|---|
| Calculated (%): | 74.71 | 8.47 | 4.34 |
| Found (%): | 74.61 | 8.28 | 4.35 |

Ultraviolet analysis of the product:

| $\lambda max\ ^{(m\mu)}$: | 265 |
|---|---|
| $E_{1\ cm}^{1\%}$ ($C_2H_5OH$): | 108.0 |

EXAMPLE 5

Synthesis of 2,2,7,8-tetramethyl-5,6-dinicotinoyloxychroman

A pyridine solution was first prepared in accordance with the procedure given in Item (a) of Example 4 by treating 2.2 grams (0.01 mol) of 2,2,7,8-tetramethylchroman-5,6-quinone. The resulting pyridine solution was subjected to reaction with 6.8 grams of nicotinic anhydride in accordance with the procedure given in Item (b) of said Example 4. The purified product (3.2 grams) was obtained in yellow crystals having a melting point 141°–142°C.

Elementary analysis of the product of the formula $C_{25}H_{24}N_2O_5$ was:

|  | C | H | N |
|---|---|---|---|
| Calculated (%): | 69.42 | 5.60 | 6.49 |
| Found (%): | 69.69 | 5.76 | 6.40 |

In analogous methods to those preceding Examples, the following Examples 6–8 were carried out to obtain the compounds represented by the general formula:

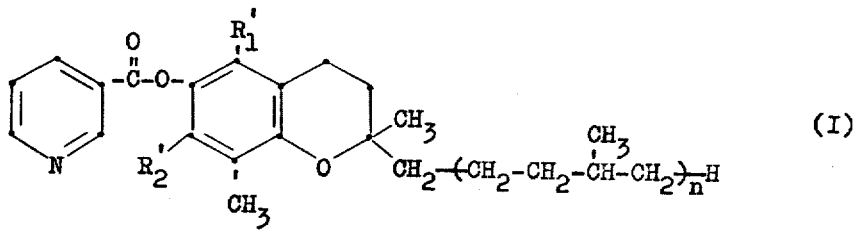

The radicals $R_1'$ and $R_2'$, the value for $n$ in the above formula, elementary analysis and the melting point of the respective compounds are listed in the Table:

wherein $n$ designates 0 or an integer of from 1 to 3; $R_1'$ designates a radical

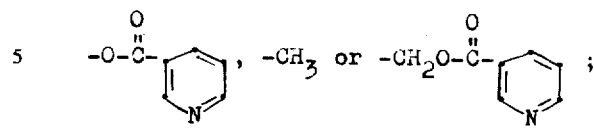

and $R_2'$ designates a radical —$CH_3$ or

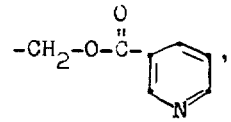

with the provision that $R_2'$ is —$CH_3$ where $R_1'$ is $$-O-\overset{O}{\underset{\|}{C}}-\text{(pyridyl)},$$

and that there is no case where both the radicals $R_1'$ and $R_2'$ are simultaneously the radicals of —$CH_3$.

TABLE

| Example | n | Compound (I) R$_1'$ | R$_2'$ | Chemical formula (Melting point) | Analysis Calculated (Found) C | H | N |
|---|---|---|---|---|---|---|---|
| 6 | 0 | —CH₃ | —CH₂—O—C(=O)—(pyridyl) | C₂₉H₂₉N₂O₅ (125°–126°C) | 69.94 (69.82) | 5.88 (5.93) | 6.28 (6.12) |
| 7 | 0 | —CH₂—O—C(=O)—(pyridyl) | —CH₃ | C₂₉H₂₉N₂O₅ (114°–115°C) | 69.94 (69.99) | 5.88 (6.15) | 6.28 (6.19) |
| 8 | 0 | —CH₂—O—C(=O)—(pyridyl) | —CH₂—O—C(=O)—(pyridyl) | C₃₆H₃₉N₃O₇ (64°–65°C) | 67.66 (67.65) | 5.15 (5.22) | 7.40 (7.43) |

What is claimed is:

1. Chromanol nicotinate derivatives having the formula:

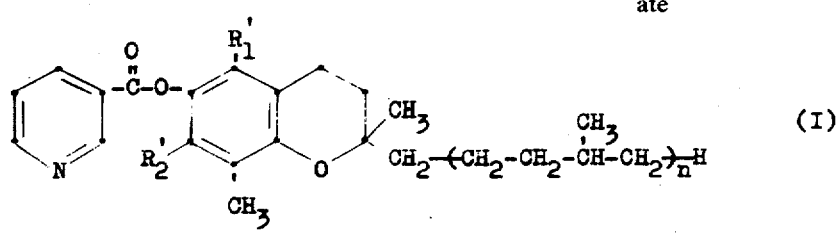

2. 7-Nicotinoyloxymethyl-β-tocopheryl nicotinate
3. 5-Nicotinoyloxymethyl-γ-tocopheryl nicotinate
4. 5,7-Bisnicotinoyloxymethyl-δ-tocopheryl nicotinate 5. 5-Nicotinoyloxy-γ-tocopheryl nicotinate
6. 2,2,7,8-Tetramethyl-5,6-dinicotinoyloxychroman
7. 2,2,5,8-Tetramethyl-6-nicotinoyloxy-7-nicotinoyloxymethylchroman
8. 2,2,7,8-Tetramethyl-5-nicotinoyloxymethyl-6-nicotinoyloxychroman
9. 2,2,8-Trimethyl-5,7-dinocotinoyloxymethyl-6-nicotinoyloxychroman

* * * * *